(12) United States Patent
Coates et al.

(10) Patent No.: US 7,517,095 B2
(45) Date of Patent: Apr. 14, 2009

(54) IMAGE DISPLAY APPARATUS

(75) Inventors: Nicholas Richard Coates, Crowborough (GB); Roger Brian Huxford, Burgess Hill (GB)

(73) Assignee: SEOS Limited, West Sussex (GB)

( * ) Notice: Subject to any disclaimer, the term of this patent is extended or adjusted under 35 U.S.C. 154(b) by 441 days.

(21) Appl. No.: 10/555,911

(22) PCT Filed: Apr. 21, 2004

(86) PCT No.: PCT/GB2004/001682
§ 371 (c)(1), (2), (4) Date: Nov. 8, 2005

(87) PCT Pub. No.: WO2004/102973
PCT Pub. Date: Nov. 25, 2004

(65) Prior Publication Data
US 2007/0126996 A1  Jun. 7, 2007

(30) Foreign Application Priority Data
May 14, 2003  (GB)  ................................ 0311128.3

(51) Int. Cl.
G03B 21/28 (2006.01)
G03B 21/00 (2006.01)
G03B 21/20 (2006.01)
G03B 21/14 (2006.01)
G02F 1/1335 (2006.01)

(52) U.S. Cl. ............................ 353/98; 353/31; 353/38; 353/102; 349/5

(58) Field of Classification Search ................... 353/31, 353/38, 69, 98, 99, 102, 122; 356/327; 348/743, 348/744; 349/5
See application file for complete search history.

(56) References Cited

U.S. PATENT DOCUMENTS

| 5,871,266 A | * | 2/1999 | Negishi et al. ................. 353/98 |
| 5,905,545 A | * | 5/1999 | Poradish et al. ............. 348/743 |
| 6,323,946 B1 | * | 11/2001 | Norton ........................ 356/327 |
| 2002/0191235 A1 | | 12/2002 | Salsman et al. ................. 359/9 |

FOREIGN PATENT DOCUMENTS

| EP | 0 566002 A | 10/1993 |
| EP | 0 829747 A | 3/1998 |
| WO | WO 02/03687 | 1/2002 |
| WO | WO 02/069030 | 9/2002 |

OTHER PUBLICATIONS

"Front Surface Mirror", Mitsubishi Digital Electronics America, Mitsubishi Tech-Notes, [Online] 2001, XP002288432 Retrieved from the Internet: URL:http://www.mitsubishi-tv.com/frontsurfacemirror.html>[retrieved on Jul. 14, 2004].*

(Continued)

*Primary Examiner*—Melissa J Koval
(74) *Attorney, Agent, or Firm*—Iandiorio Teska & Coleman

(57) ABSTRACT

Image display apparatus comprising a projector, at least one primary modulator (4,6,8) for modulating light, an auxiliary modulator (36) for modulating the light modulated by the primary modulator, and an optical device (32) for relaying the light modulated by the primary modulator to the auxiliary modulator (36), the optical device (32) comprising a concave mirror and at least one refractive element.

12 Claims, 9 Drawing Sheets

OTHER PUBLICATIONS

"*Front Surface Mirror*", Mitsubishi Digital Electronics America, Mitsubishi Tech-Notes, [Online] 2001, XP002288432 Retrieved from the Internet: URL:http://www.mitsubishi-tv.com/frontsurfacemirror.html> [retrieved on Jul. 14, 2004].

* cited by examiner

IMAGE DISPLAY APPARATUS

This invention relates to image display apparatus and, more especially, this invention relates to image display apparatus having more than one modulator for modulating light.

Image display apparatus with more than one modulator for modulating light is known. More specifically, known image display apparatus uses a primary modulator and an auxiliary modulator to modulate picture elements of an image. In such known image display apparatus, the contrast range of the projected image is able to be extended as a result of the finite minimum image brightness above true black being reduced. GB 2317290 shows how the contrast of images is able to be improved.

In the known method as described in GB 2317290, if monochromatic modulators are used to modulate the light in the image display apparatus, then a first primary modulator is needed to modulate red light, a second primary modulator is needed to modulate green light, and a third primary modulator is needed to modulate blue light. If it is desired to improve the contrast and dynamic range of images from the image display apparatus, then each of the first, second and third primary modulators needs an auxiliary modulator. A total of six modulators is then needed in order to improve the contrast. This is expensive and complicated to manufacture. More specifically, costs are substantial due to the number of modulators required. Complexities of manufacture are due to the complex optical components needed firstly to image the three primary modulators for each of the three colours onto the auxiliary modulator for the same colour, and secondly for the optical components to be able to combine the modulated light into a single image that can be projected through projection optics to a display screen. This problem exists for both reflective and transmissive light modulators.

Alternatively, a full colour modulator could be used to modulate light in image display apparatus. Transmissive full colour modulators have an array of red, green and blue pixels. These transmissive full colour modulators tend to be large compared to monochrome modulators. Also, when the transmissive full colour modulators are used in the image display apparatus, they suffer from inherent and permanent misconvergence. It is therefore very difficult optically to image a primary full colour modulator onto an auxiliary full colour modulator such that the pixel on pixel alignment is sufficiently accurate to achieve low loss of light and improved contrast.

Single monochrome primary modulators can also be used with colour sequential illumination in order to produce a full colour image. However, this type of colour sequential illumination can produce temporal artifacts which would not be reduced if an auxiliary modulator were to be used.

Consideration also needs to be given to the optical apparatus which is used in the image display apparatus and which is for relaying the image from the primary modulator to the auxiliary modulator. If the primary modulator and the auxiliary modulator are of the same size, then the image must be relayed with a unity magnification. Preferably, the image should be relayed such that each pixel in the primary modulator is imaged onto the equivalent pixel in the auxiliary modulator. This applies to both reflective and transmissive light modulators. Refractive systems for relaying the image can be used, and when they are designed, they need to be designed in order to take into account performance in terms of resolution, scatter and colour correction. Compromises have to be made with such systems. In order to reduce scatter and hence a lowering of contrast in the image display apparatus, the number of refractive elements needs to be kept to a minimum, but more lenses are needed to provide sufficient resolution and colour correction, which in turn increases any scatter. Also, refractive systems that provide sufficient resolution and colour correction are longer as a result of the increased number of lenses, and they are consequently more expensive.

It is an aim of the present invention to obviate or reduce the above mentioned problems.

Accordingly, in one non-limiting embodiment of the present invention there is provided image display apparatus comprising projector means, at least one primary modulator for modulating light, an auxiliary modulator for modulating the light modulated by the primary modulator, and optical means for relaying the light modulated by the primary modulator to the auxiliary modulator, the optical means comprising a concave mirror and at least one refractive element.

In a first embodiment of the invention, the image display apparatus is one in which there is only one primary modulator.

In a second embodiment of the invention, the image display apparatus is one in which there are three of the primary modulators, the three primary modulators comprising a first primary modulator for modulating red light, a second primary modulator for modulating green light, and a third primary modulator for modulating blue light, and in which the auxiliary modulator modulates the light modulated by the three primary modulators, and in which the optical means for relaying the light modulated by the three primary modulators to the auxiliary modulator comprises a concave mirror and at least one refractive element.

In all embodiments of the invention, the concave mirror may be a front surface mirror, or a rear surface mirror. A presently preferred rear surface concave mirror is a rear surface Mangin mirror.

In other embodiments of the invention, the optical means may comprise two of the refractive elements. The optical means may be such that one of the refractive elements is a spherical refractive element, and the other of the refractive elements is an aspherical refractive element. Alternatively, the optical means may be such that the two refractive elements are two spherical refractive elements.

The optical means may alternatively comprise three of the refractive elements. In this case, the optical means may be such that the three refractive elements comprise three spherical refractive elements arranged as a triplet. Generally, the performance of the optical means is able to be improved by using more than one refractive element. Exemplary performance may be obtained with three refractive elements, for example three spherical lenses. Such an arrangement accurately relays an image from the primary modulator to the auxiliary modulator.

The optical means may alternatively comprise four of the refractive elements.

The image display apparatus of the present invention is such that the dynamic range of the image display apparatus is enhanced. The contrast of images obtained may also be improved. Advantages over known image display apparatus including improving resolution and colour correction, enabling a pixel on the primary modulator accurately to be imaged onto the equivalent pixel on the auxiliary modulator.

The image display apparatus of the present invention may include a light source. The auxiliary modulator operates to modulate the light for a second time, before the light is projected by the projector means.

The primary and auxiliary modulators may be arranged equidistant from the optical axis of the optical means.

The optical means may comprise at least one refractive element and a concave mirror. The image relayed from the primary modulator to the auxiliary modulator may be relayed with unity magnification, the light passing through at least one refractive element to the concave mirror, where reflection takes place, the light returning through the refractive elements to the auxiliary modulator.

The performance of the optical means may be further improved by using refractive elements of differing glass types, such for example as low and high dispersion glasses. The refractive elements can be spherical refractive elements, aspherical refractive elements, or a combination of spherical and aspherical refractive elements.

The optical means may be suitable for relaying images between both reflective and transmissive light modulators.

Embodiments of the invention will now be described solely by way of example and with reference to the accompanying drawings in which.

Figure 1:
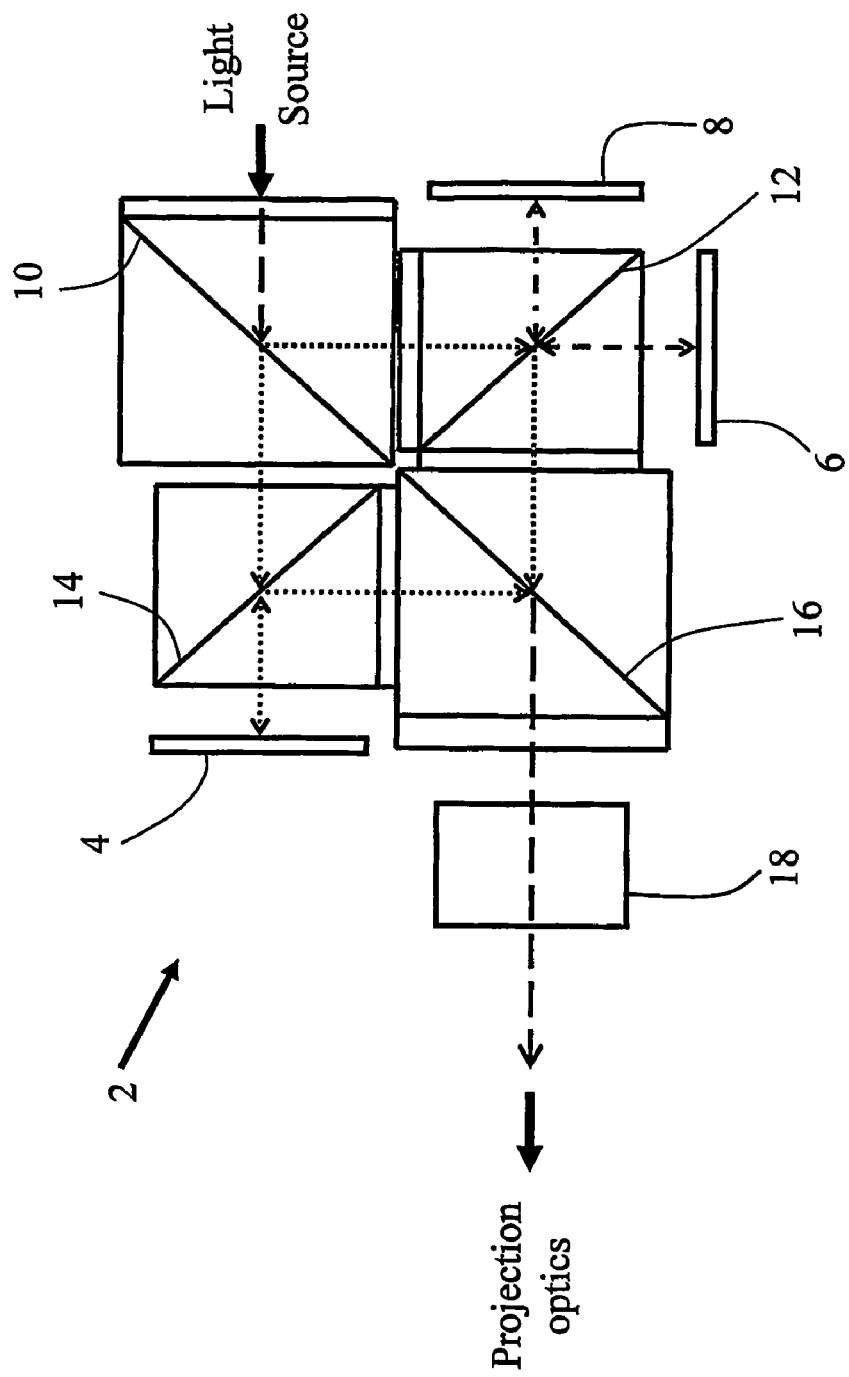
FIG. 1 shows known image display apparatus using a first primary modulator for modulating red light, a second primary modulator for modulating green light, a third primary modulator for modulating blue light, and optical means for splitting and recombining the modulated red, green and blue lights.

Referring to FIG. 1, there is shown the optical layout of known image display apparatus 2. The image display apparatus 2 comprises a first primary modulator 4 for modulating green light, a second primary modulator 6 for modulating red light, and a third primary modulator 8 for modulating blue light. The incident light which illuminates the modulators 4, 6, 8 passes through optical elements 10, 12, 14, 16 which are known as a colour cube. The optical elements 10, 12, 14, 16 split the incident light into red, green and blue components. The optical elements 10, 12, 14, 16 then recombine the modulated red, green and blue light. Projection optics 18 in a projector then project an image onto a screen.

The optical arrangement shown in FIG. 1, along with other proprietary optical arrangements, are used widely in image display apparatus to modulate the light. The optical arrangements ensure that the light, having been split into red, green and blue components, follows a path that is equal in length for all colours. The arrangement of the modulators is such that each of the modulators is superimposed optically. Therefore, in this particular type of optical arrangement, an auxiliary modulator can be used to modulate the light that has previously been modulated by the three primary modulators which modulate green light, red light and blue light as described above. The three primary modulators are optically superimposed, and therefore the image from these three primary modulators can be relayed to the auxiliary modulator using a single optical relay means.

Figure 2:
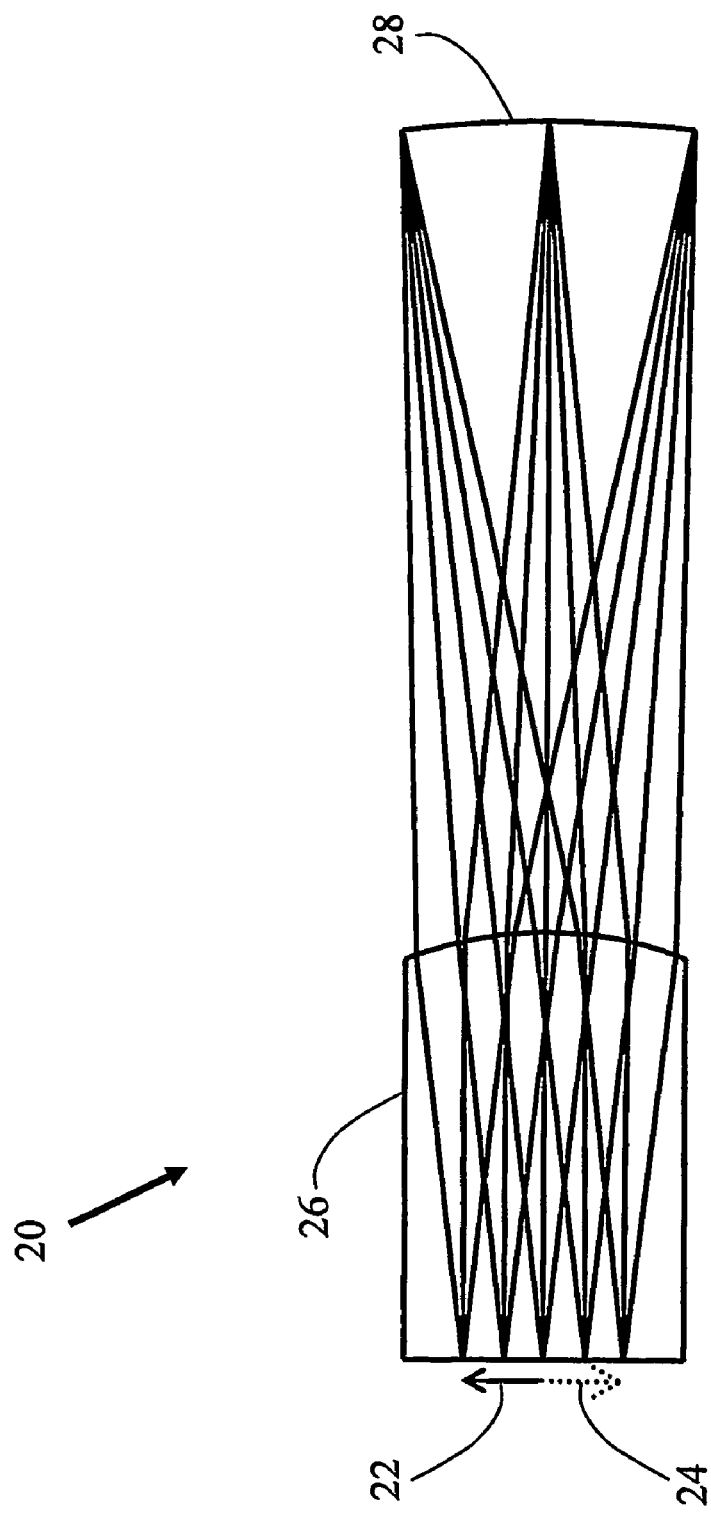
FIG. 2 shows a known monocentric mirror system having object and image surfaces at the centre of curvature of a primary mirror.

FIG. 2 shows known optical means 20 for relaying an image with unity magnification. The optical means 20 is in the form of a monocentric mirror system having object and image surfaces at the centre of curvature of a mirror. Such a monocentric mirror system has been proposed by Dyson (J Opt. Soc. Am. 49, 713-1959). An object 22 is relayed to an image position 24 via a lens 26 and a mirror 28. An aperture stop of the moncentric mirror system is at the mirror 28. With the monocentric mirror system being symmetrical, spherical aberration, coma and distortion are corrected by the mirror 28. Field curvature in the system is corrected by making the radius of curvature of the lens 26 equal to $((n-1)/n)R'''$, where $R'''$ is the radius of the mirror 28. However, for any useful field of view, there is astigmatism, spherical aberration of the principal ray at the lens surface causing a departure from telecentricity and some residual chromatic aberration.

Figure 3:
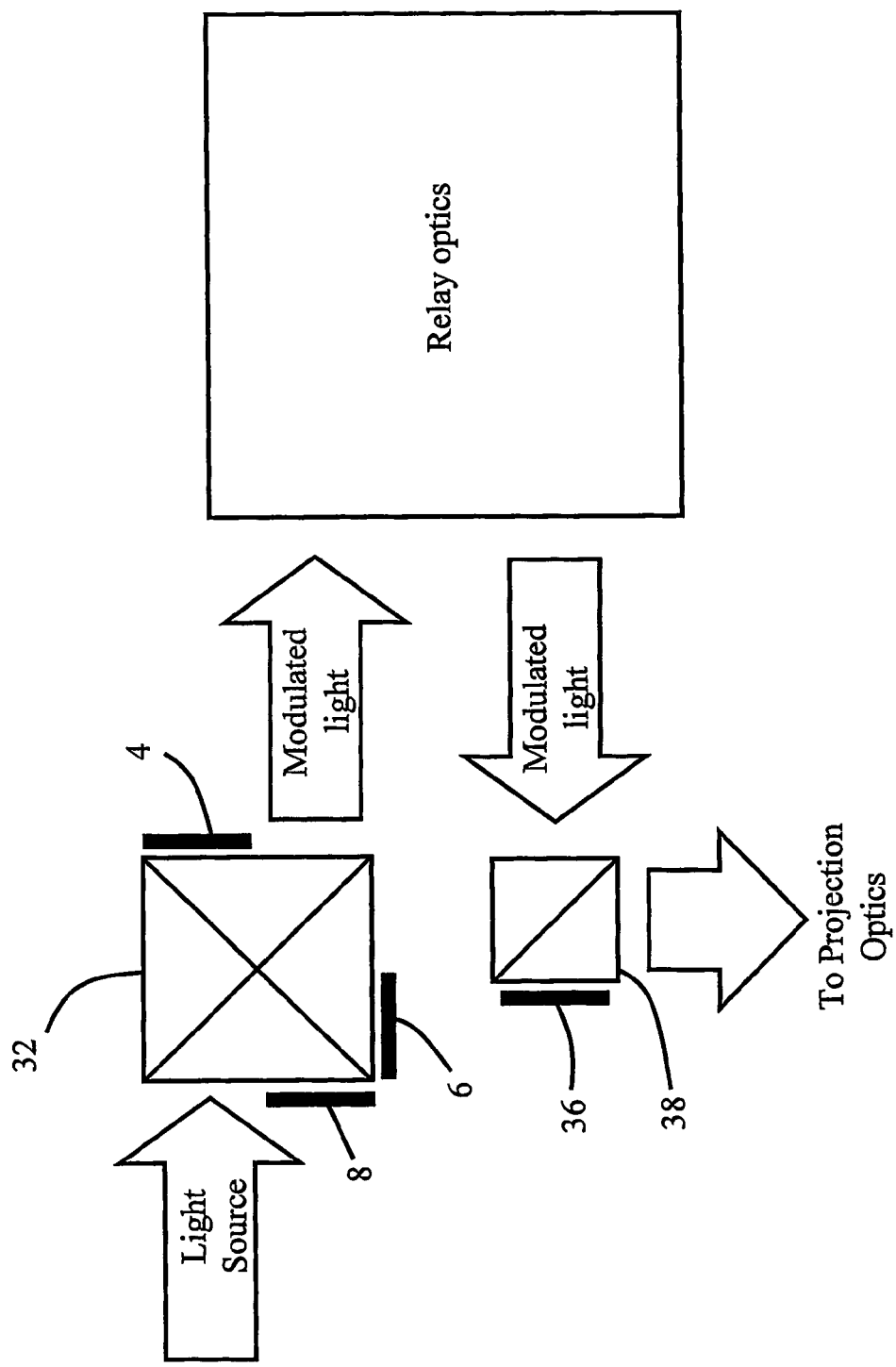
FIG. 3 shows a schematic layout of the present invention.

FIG. 3 shows schematically the layout of image display apparatus of the present invention. The image display apparatus uses reflective light modulators with a light source entering a colour cube optical system 32. The light is first modulated by a green primary modulator 4, a red primary modulator 6 and a blue primary modulator 8. This modulated light exits the colour cube optical system 32 and is relayed via relay optics to an auxiliary modulator 36. A polarising beam splitter 38 allows light to pass through to the modulator 36. The polarisation of the light modulated by the auxiliary modulator 36 is rotated to polarised light of the orthogonal direction. The polarising beam splitter 38 reflects this light to the projection optics of the projector. FIG. 3 shows the layout for reflective light modulators such as liquid crystal on silicon modulators, or ferroelectric type modulators. The relay optics are also compatible with transmissive liquid crystal light modulators.

In the following FIGS. 4-9 similar parts have been given the same reference numerals for ease of comparison and understanding.

Figure 4:
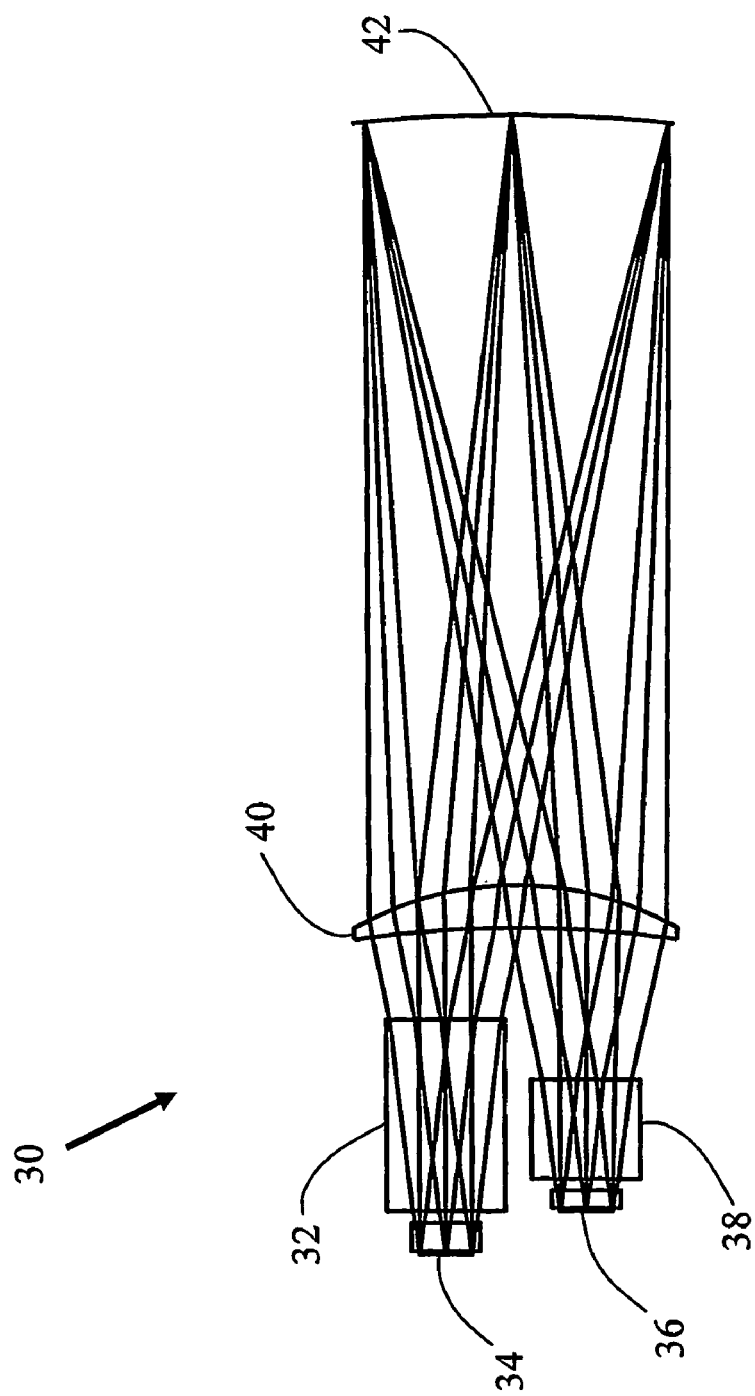
FIG. 4 shows an embodiment of the present invention with a single lens and a mirror.

FIG. 4 shows image display apparatus 30 comprising a colour cube optical system 32 as shown in FIG. 1. Reference numeral 34 shows one of the primary modulators for red, green or blue light. The light path from only one of these primary modulators can be used since the primary red modulator, the primary green modulator and the primary blue modulator are optically superimposed. The light which has been modulated by these three modulators in the colour cube optical system 32 passes through a spherical lens 40, and is reflected by a spherical front surface mirror 42, and then returned through a spherical lens 40 to the light modulator 36. The light modulator 36 is a reflective light modulator such for example as a liquid crystal on silicon light modulator. A polarising beam splitter 38 allows light to pass through the polarising beam splitter 38 towards the primary modulator 36, whereby the action of the primary modulator 36 changes the polarisation of the light to linearly polarised light polarised in the orthogonal direction. This modulated light is reflected by the polarising beam splitter 38 towards the projection optics of the image display apparatus 30. The object surface and the image surface are not placed at the same position with relation to the mirror. This is due to the different amounts of glass in the system, that is the colour cube and the polarising beam splitter.

Figure 5:
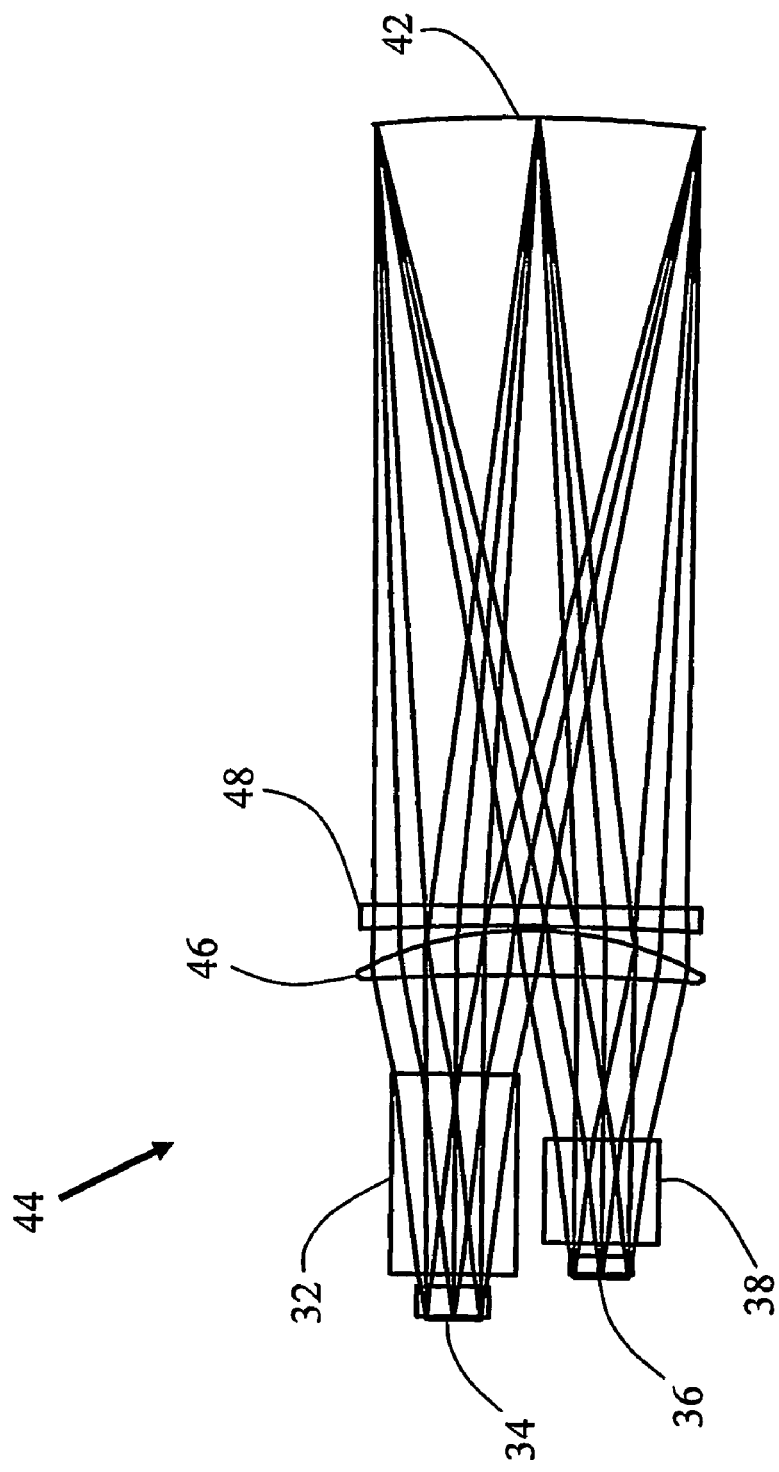
FIG. 5 shows an embodiment of the present invention with one spherical lens, one aspherical lens, and a mirror.

FIG. 5 shows image display apparatus 44. Modulated light from a colour cube optical system 32 is relayed to a modulator 36 by a spherical lens 46, an aspherical corrector 48 and a mirror 42. Light is reflected off the mirror 42, back through the two refractive elements 36, 42, and through a polarising beam splitter 38 to the modulator 36.

Figure 6:
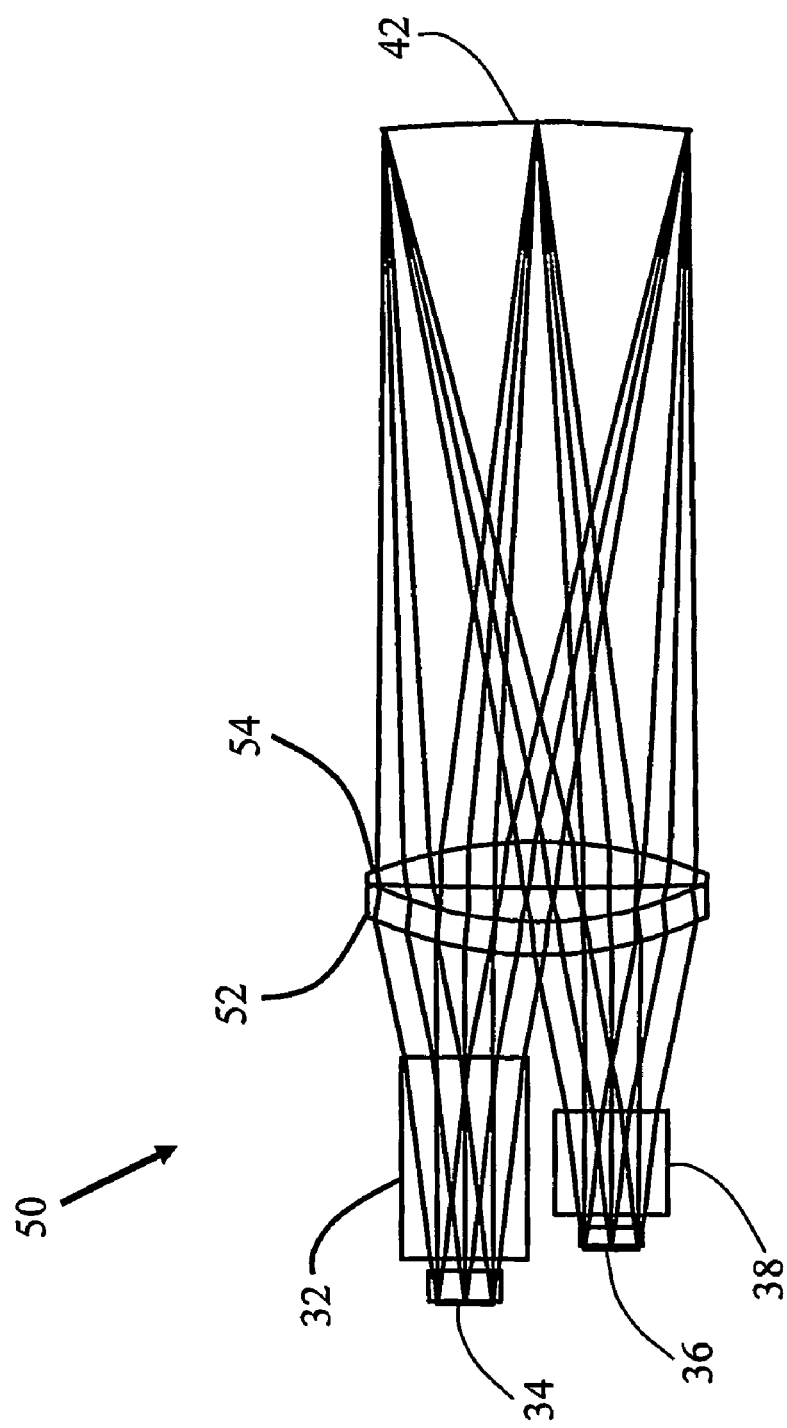
FIG. 6 shows an embodiment of the present invention with two spherical lenses and a mirror.

FIG. 6 shows image display apparatus 50. Modulated light from a colour cube optical system 32 is relayed to a modulator 36 by a spherical lens 52, a spherical lens 54 and a mirror 42. Light is reflected off the mirror 42 back through the two refractive elements 52, 54, and through a polarising beam splitter 38 to the modulator 36.

Figure 7:
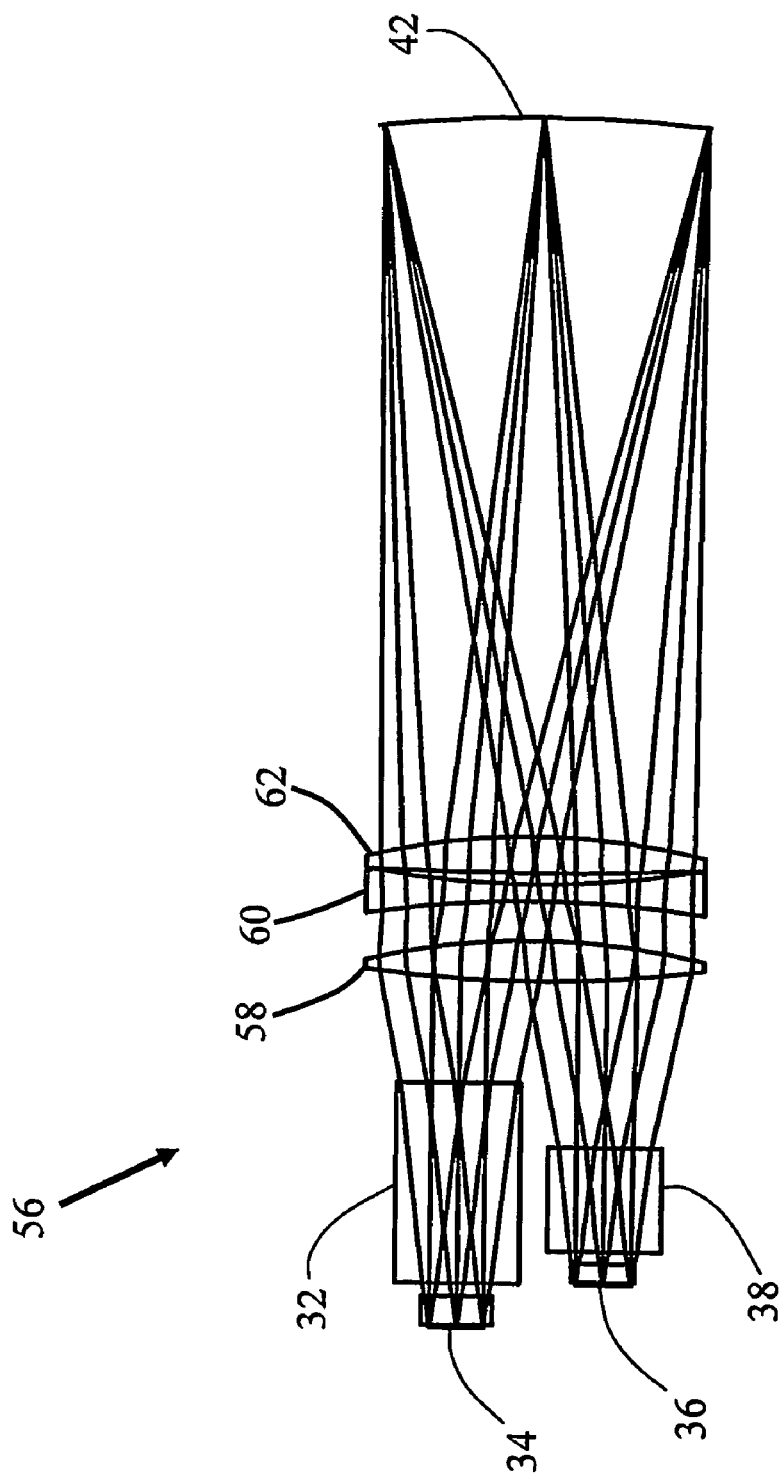
FIG. 7 shows an embodiment of the present invention with three spherical lenses and a mirror.

FIG. 7 shows image display apparatus 56. Modulated light from a colour cube optical system 32 is relayed to a modulator 36 by a spherical lens 58, a spherical lens 60, a spherical lens 62 and a mirror 42. Light is reflected off the mirror 42, back through the three refractive elements 58, 60, 62, and through a polarising beam splitter 38 to the modulator 36.

Figure 8:
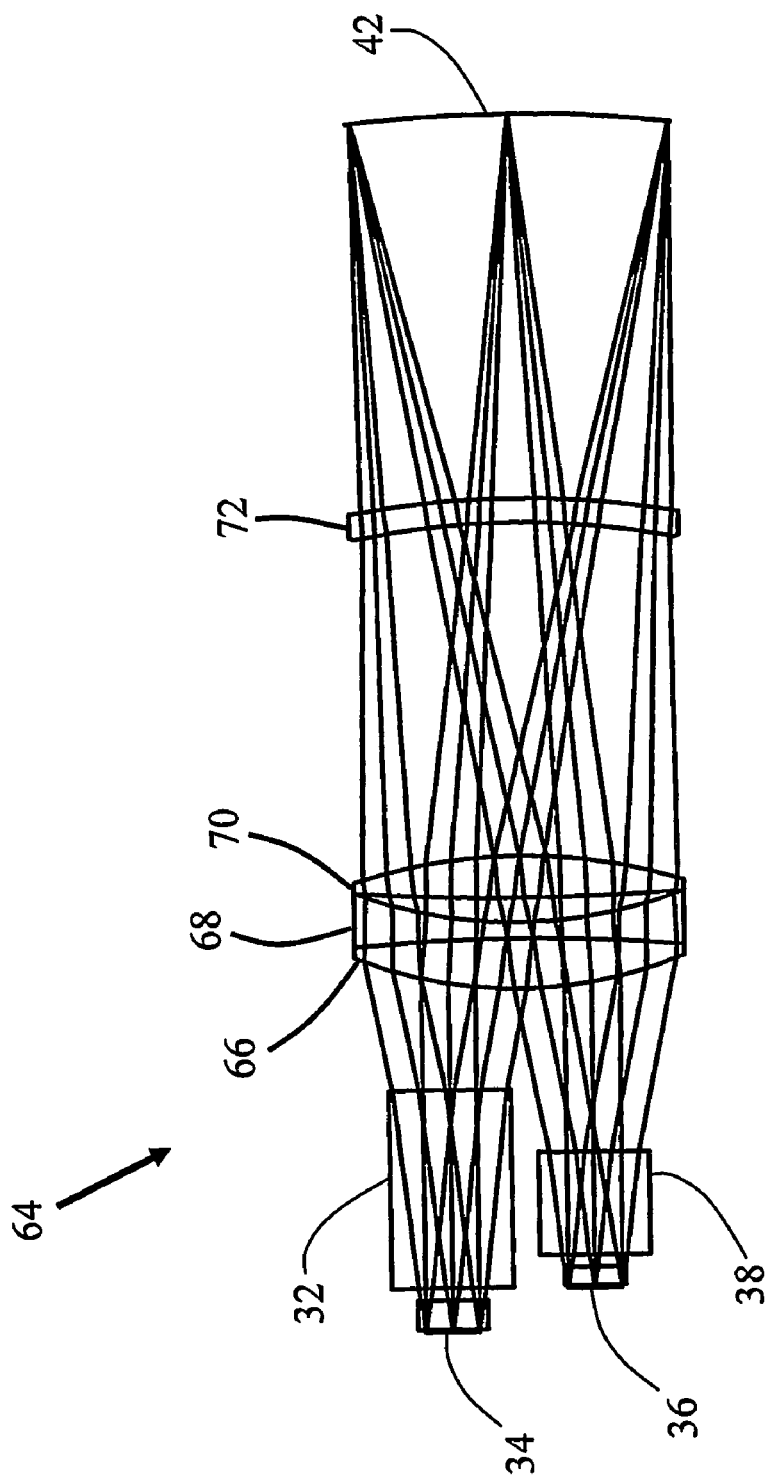
FIG. 8 shows an embodiment of the present invention with four spherical lenses and a mirror.

FIG. 8 shows image display apparatus 64. Modulated light from a colour cube optical system 32 is relayed to a modulator 36 by a spherical lens 66, a spherical lens 68, a spherical lens 70, a spherical meniscus lens 72 and a mirror 42. Light is reflected off the mirror 42, back through the three refractive elements 66, 68, 70, and through a polarising beam splitter 38 to the modulator 36.

Figure 9:
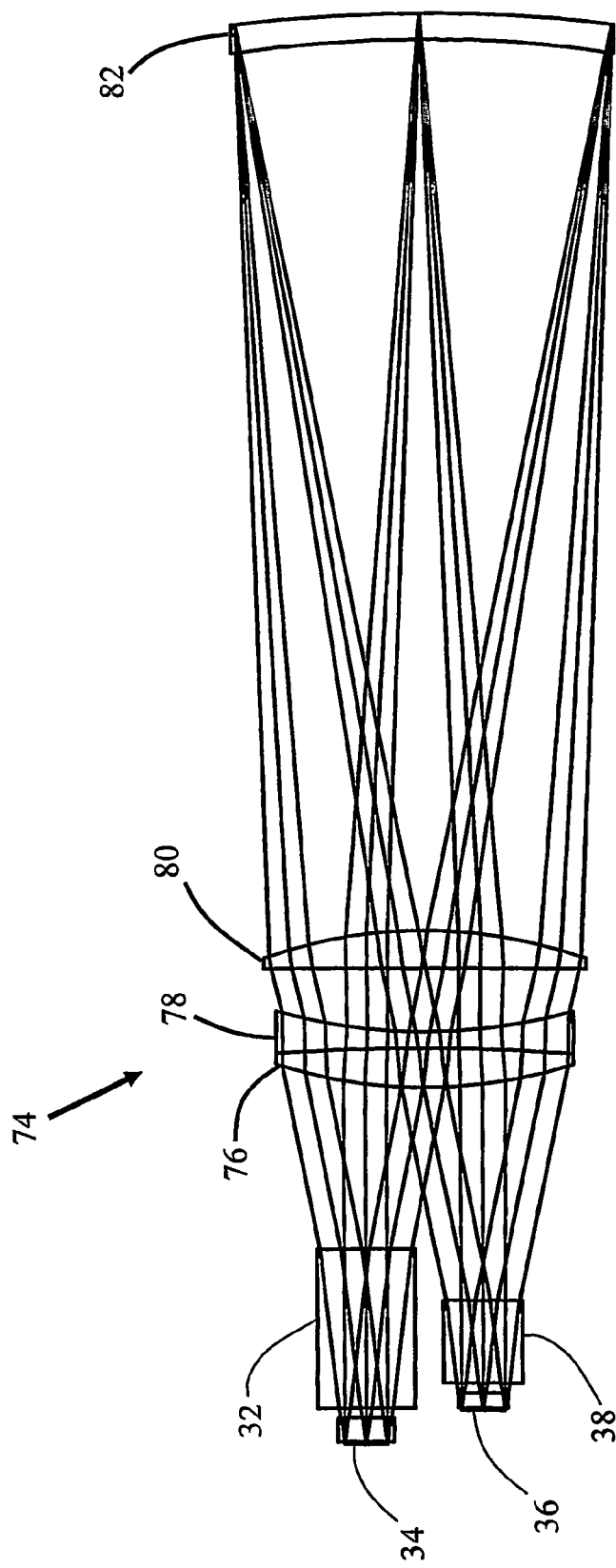
FIG. 9 shows an embodiment of the present invention with three spherical lenses and a Mangin mirror.

FIG. 9 shows image display apparatus 74. Modulated light from a colour cube optical system 32 is relayed to a modulator 36 by a spherical lens 76, a spherical lens 78, a spherical lens 80 and a Mangin mirror 82. Light is reflected off the mirror 82, back through the three refractive elements 76, 78, 80, and through a polarising beam splitter 38 to the modulator 36.

The performance of the embodiments of the invention described above with reference to the FIGS. 4-9 has been assessed using a field of view determined by the size of the light modulators which measure 15.4 mm×12.3 mm, offset from the optical axis by 16.5 mm. In all embodiments, it was found that the optical relay system provided unity magnification, colour correction in the range of 440-650 nm and 0% vignetting. Distortion in the embodiments of the invention described above with reference to FIGS. 7, 8 and 9 is typically 2 μm. FIG. 4 had a distortion of 8 μm, Figure had a distortion of 4 μm and FIG. 6 had a distortion of 10-15 μm. The size of the optical relay system varies with the size of the light modulators used in the image display apparatus, in order to achieve the desired field of view in the relay system.

The apparatus shown in FIGS. 7, 8 and 9 demonstrated the best performance of the illustrated embodiments of the invention. In particular, the air space triplet lenses 58, 60, 62 in FIG. 7 corrected the field of curvature of the primary mirror, tangential astigmatism and spherical aberration of the principle rays. Correction of the spherical aberration maintains good telecentricity across the field of view, which is particularly required when liquid crystal on silicon modulators or transmitting liquid crystal modulators are used in order to maintain good colour and brightness uniformity across the field of view. Any residual chromatic aberration is able to be corrected using a combination of low and high dispersion glass types in the triplet lenses 58, 60, 62.

The embodiments of the invention described above with reference to the accompanying drawings illustrate that the image display apparatus of the present invention is able to be produced in a compact manner and is able to relay an image from at least one primary modulator to an auxiliary modulator, with improved performance over purely refractive systems.

It is to be appreciated that the embodiments of the invention described above with reference to the accompanying drawings have been given by way of example only and that modifications may be effected.

The invention claimed is:

1. Image display apparatus comprising projector means having a single light path, at least one primary modulator for modulating light, an auxiliary modulator disposed downstream in said light path from said primary modulator for modulating the light modulated by the primary modulator, and optical means disposed between said primary modulator and auxiliary modulator for relaying the light modulated by the primary modulator to the auxiliary modulator, the optical means comprising a concave mirror and at least one refractive element.

2. Image display apparatus according to claim 1 in which there is only one primary modulator.

3. Image display apparatus according to claim 1 in which there are three of the primary modulators, the three primary modulators comprising a first primary modulator for modulating red light, a second primary modulator for modulating green light, and a third primary modulator for modulating blue light, and in which the auxiliary modulator modulates the light modulated by the three primary modulators, and in which the optical means is for relaying the light modulated by the three primary modulators to the auxiliary modulator.

4. Image display apparatus according to claim 1 in which the concave mirror is a front surface mirror.

5. Image display apparatus according to claim 1 in which the concave mirror is a rear surface mirror.

6. Image display apparatus according to claim 5 in which the concave mirror is a rear surface Mangin mirror.

7. Image display apparatus according to claim 1 in which the optical means comprises two of the refractive elements.

8. Image display apparatus according to claim 7 in which the optical means is such that one of the refractive elements is a spherical refractive element, and the other of the refractive elements is an aspherical refractive element.

9. Image display apparatus according to claim 7 in which the optical means is such that the two refractive elements are two spherical refractive elements.

10. Image display apparatus according to claim 1 in which the optical means comprises three of the refractive elements.

11. Image display apparatus according to claim 10 in which the optical means is such that the three refractive elements are three spherical refractive elements arranged as a triplet.

12. Image display apparatus according to claim 1 in which the optical means comprises four of the refractive elements.

* * * * *